United States Patent Office 2,973,396
Patented Feb. 28, 1961

2,973,396

METHOD OF PURIFYING DIOLEFINS

Edward R. Atkinson, Wellesley, and Jacob G. Mark and David Rubinstein, Brookline, Mass., assignors to W. R. Grace & Co., Cambridge, Mass., a corporation of Connecticut No Drawing. Filed Jan. 30, 1958, Ser. No. 712,092

9 Claims. (Cl. 260—681.5)

Conjugated diolefins such as butadiene, isoprene, and piperylene, widely used as constituents of artificial rubber and other resinous materials, are ordinarily manufactured by thermal or catalytic treatment of petroleum. A complex mixture is produced containing diolefins, monoolefins and saturated hydrocarbons which are difficult to separate from each other by fractionation because their boiling points lie within such a narrow temperature range. The purification of diolefins has been, therefore, a difficult and expensive part of their preparation, and many attempts have been made to discover simpler and less complicated methods of separation.

The formation of compounds between cuprous salts and alkenes or conjugated dienes has been recognized for some time.[1] Today the formation of these and analogous compounds with salts of other metals, such as silver, is well understood as a typical dative bonding process. Compounds prepared from cuprous chloride and simple olefins decompose at about 0° C., but compounds prepared from isoprene, butadiene, and piperylene are stable to temperatures of 45°, 62°, and 68° C., respectively. Practical advantage has been taken of this fact in separating conjugated dienes from hydrocarbon streams containing olefin and paraffin hydrocarbons as well. All such processes involve the formation of the cuprous-diene compound at lower temperatures, the separation of unreacted hydrocarbon material, and the subsequent decomposition of the compound by heating to liberate pure diene.

A process for separating diolefins from a mixed hydrocarbon stream in which solid cuprous chloride is used as the absorbent is described in the following U.S. Patents: 2,359,020; 2,389,647; 2,395,954; 2,395,955; 2,395,956; 2,395,957; 2,395,958; and 2,395,959. In this process, hydrocarbon streams containing dienes as, for example, butadiene, isoprene, or piperylene, were agitated with finely ground cuprous chloride in a ball mill to absorb the diene. Unabsorbed hydrocarbons were removed under vacuum. The residue in the mill was then heated to decompose the diene-cuprous chloride compound and liberate high-quality diene which was removed by distillation.

In the above-described process, as in all diene-cuprous chloride absorption processes known to the art, separation of diene was possible only when the diene was present in the mixed stream in a proportion of at least as high as 50%. With more dilute streams, the efficiency of the absorption process was so low and absorption proceeded so slowly that a practical separation could not be made. Even with the rather concentrated streams customarily used, i.e., between 50% and 75%, recovery of diene was unpredictable and was frequently quite low.

We have discovered that the absorption of conjugated dienes by metal salts can be rendered very much more efficient by the use of a catalyst for the absorption reaction. When a catalyst is used, absorption proceeds rapidly, and percentage recovery of pure diene is substantially improved. The efficiency of the process is so much improved that a satisfactory separation can now be made even when streams containing as little as 20% diene are used. This is of particular importance economically, since it makes possible the harvesting of significant amounts of diene from a hitherto unusable source.

We have found that methyl alcohol, ethyl alcohol, and n-propyl alcohol are effective catalysts for promoting the absorption of dienes by cuprous chloride or its equivalents.

In all our experimental work, solid reagent salts such as, for example, cuprous chloride or silver chloride, were used as absorbents for the conjugated dienes. Polymerization and other undesirable side reactions of the hydrocarbons present were prevented or substantially reduced by addition to the absorbent of a polymerization inhibitor and a basic material. Any of the substances commonly known as polymerization inhibitors for conjugated dienes may be used. For example, secondary aryl amines, polynuclear phenols, polyhydroxy phenols, or substituted phenols may be used. The inhibitor used in the following examples is phenyl-beta-naphthyl amine. Likewise, any organic or inorganic basic substance which is stable under the conditions of the reaction and which is nonvolatile may be added to the absorbent in order to reduce side reactions involving the hydrocarbons present. We have ordinarily used calcium hydroxide for this purpose, as shown by the examples which follow, but other basic substances such as the oxides, hydroxides or carbonates of alkali metals or alkaline earth metals; primary, secondary or tertiary amines; aromatic amines, or aliphatic or aromatic quaternary ammonium bases may be used.

We have found in our work that C.P. cuprous chloride has far greater absorptive capacity than the technical grade, even when the latter is very finely ground. In general, we have found the purity of the absorbent more important than its state of subdivision.

Absorption was carried out in a rod or ball mill, usually provided with a scraping agitator to prevent caking of the absorbent on the walls of the reactor. The mill was suitably jacketed and was provided with means for heating and cooling the jacket, as well as for introducing the charge stock and removing the products of the reaction.

In a typical run, the reactor was cooled to the desired absorption temperatures, the precooled hydrocarbon stream was added, and the mixture was ground for the desired length of time, usually twenty-five minutes. Unabsorbed hydrocarbons were removed by allowing the reactor contents to warm to about 20° C. and lowering the pressure in the system to 120–130 mm. as rapidly as condenser efficiency permitted. To recover absorbed diene, the reactor was heated to 70–130° C. and the diene allowed to distill at atmospheric pressure; in the final stage of distillation, pressure was lowered to 130 mm.

For isoprene assay, we have used a spectroscopic method of analysis, measuring the absorption of ultraviolet light at the wave length at which isoprene is known to show peak absorption. A Beckman Model DU spectrophotometer was used and solutions in purified methyl alcohol containing about $7 \times 10^{-3}$ grams of isoprene per liter were examined at 223 millimicrons with solvent as a reference standard. The method was standardized against pure isoprene and the standardization checked by occasional measurement of samples in spectro-grade isooctane with use of the litreature constant for isoprene in this solvent. For piperylene assay, a similar procedure was used, using published absorption data for standardization.

The purity of the isoprene recovered in the following

[1] See: "The Chemistry of the Coordination Compounds," John C. Bailar, Chapter 15, page 487, Reinhold, 1956.

examples ranged between 94% and 96%, and the piperylene recovered was 95% to 100% pure.

The absorbent used in each of the following examples consisted of a mixture of 957 g. of C.P. cuprous chloride, 40 g. calcium hydroxide and 2.5 g. of phenyl-beta-naphthylamine.

Example I

A 300-gram portion of a 50% isoprene stream was added to a precooled reactor containing an absorbent as described above. The mixture was ground for 25 minutes at a temperature of 5° C. After the unabsorbed hydrocarbon was distilled off, a total of only 15% of the isoprene contained in the stream was recovered as high purity isoprene.

When 10 cc. of methyl alcohol was added to the above cuprous chloride-isoprene mixture before grinding, recovery of isoprene rose to 72%.

It is interesting to note that on a subsequent run, with the same absorbent and the same stream and under the same operating conditions but without the addition of methyl alcohol, recovery of isoprene was so small that it could not be measured.

Example II

A charge consisting of 400 grams of a 69.2% isoprene stream was treated in the reactor with the same type of absorbent as described above and under the same conditions. A 36% recovery of isoprene was made. The addition of 10 cc. of methyl alcohol raised the isoprene recovery to 80%.

Example III

The same charge as that used in Example II, namely, 400 grams of a 69.2% isoprene stream, was ground in the reactor with the cuprous chloride absorbent for 25 minutes at a temperature of 5° C. A 36% recovery of isoprene was made. On the addition of 10 cc. of ethyl alcohol as a catalyst, the isoprene recovery rose to 77%.

Example IV

When 700 grams of a 20% isoprene stream was ground with absorbent at 3° C. for 60 minutes, there was no appreciable recovery of isoprene. After the addition of 17cc. of methyl alcohol, a 63% recovery of the isoprene present in the stream was made. Reduction of the operating temperature and lengthening the time of grinding were favorable to better recovery of isoprene from dilute streams, as evidenced by the fact that when the 20% isoprene-methyl alcohol mixture was ground for 70 minutes at −25° C., an 85% recovery was made.

In the above examples, the isoprene streams were made artificially by us by mixing commercial 95% isoprene with substances similar to those occurring in commercial isoprene streams, such as pentane or amylene. Our invention was tested also with certain commercially available hydrocarbon streams. The following examples show the results of these tests.

Example V

When 500 grams of a commercially produced 55% isoprene stream was treated with absorbent for 25 minutes at 3° C., 7% of the isoprene in the stream was recovered. After the addition of 12 cc. of methyl alcohol to a similar mixture, recovery was 82%.

Example VI

A charge of 500 grams of a commercially produced 47% stream of piperylene was treated with absorbent for 25 minutes at 3° C. With no added catalyst, recovery was 30%. When 12 cc. of methyl alcohol was added, recovery rose to 56%.

We have found that n-propyl alcohol is also effective as a catalyst in the absorption of diolefins by cuprous chloride, although to a lesser extent than methyl or ethyl alcohol. Isopropyl alcohol, on the other hand, has been found not to have any catalytic effect. In all the above examples, the proportion of alcohol used is about 2.5 cc. per 100 grams of hydrocarbon charge or 2% by weight on the hydrocarbon charge. As the quantity of alcohol is appreciably decreased, less catalytic effect is observed and when the proportion of alcohol is less than 1%, there is no significant improvement in absorption. The use of more than 2% of alcohol, while it has no harmful effect on the reaction, does not bring about any appreciable further improvement in the percentage recovery of diene.

While the mechanism by which an alcohol acts to catalyze the absorption reaction between cuprous chloride and diolefins is not well understood, it is our belief that the alcohol is involved in a transition step of the reaction between the diolefin and the cuprous chloride. According to this theory, the alcohol combines with the cuprous chloride by means of a dative bonding process involving an electron pair of the oxygen atom:

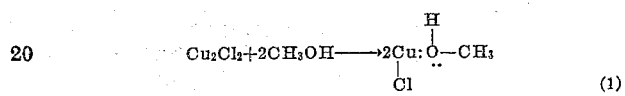

(1)

An intermediate complex then forms involving the olefin:

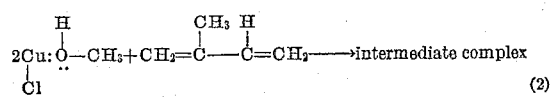

(2)

which then decomposes to give the cuprous chloride-olefin compound:

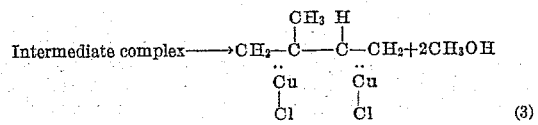

(3)

We have also used silver salts in place of cuprous salts in the purification of dienes. Our work, however, does not indicate that mercury salts may be used, despite statements in the literature which indicate that they are equivalent to copper salts.

We claim:

1. In a process for separating a diolefin from a mixed hydrocarbon stream which includes the steps of mixing the hydrocarbon stream with a diolefin-absorbing material consisting primarily of solid cuprous chloride, subjecting the mixture to conditions which promote the absorption reaction between the diolefin and the cuprous chloride, removing the unabsorbed hydrocarbon from the absorption mixture and thereafter treating the absorption product in such a manner as to recover the diolefin therefrom, the step of adding to the absorption mixture, as a catalyst for the absorption reaction, an aliphatic straight chain monohydric alcohol having from one to three carbon atoms in the chain, in an amount effective to catalyze the absorption reaction, said effective amount being between about one percent and two percent by weight of the said hydrocarbon stream.

2. A process according to claim 1 in which the alcohol is methyl alcohol.

3. A process according to claim 1 in which the alcohol is ethyl alcohol.

4. A process according to claim 1 in which the alcohol is n-propyl alcohol.

5. A process according to claim 1 in which the proportion of alcohol is not less than 1% based on the weight of the hydrocarbon charge in the reaction mixture.

6. A process according to claim 1 in which the diolefin is butadiene.

7. A process according to claim 1 in which the diolefin is isoprene.

8. A process according to claim 1 in which the diolefin is piperylene.

9. A process according to claim 1 in which the solid absorbent contains a major proportion of cuprous chloride and minor proportions of a polymerization inhibitor and of a solid inorganic basic substance.

References Cited in the file of this patent

UNITED STATES PATENTS

| 1,771,350 | Ramage | July 22, 1930 |
| 2,395,956 | Soday | Mar. 5, 1946 |
| 2,397,996 | Wilson | Apr. 9, 1946 |
| 2,411,105 | Nixon et al. | Nov. 12, 1946 |
| 2,561,822 | Savoy | July 24, 1951 |

OTHER REFERENCES

Lurè: "Sinteticheskii Kauchuk," 1934, No. 6, pages 13–18 (page 17 relied on).